(12) United States Patent
Arnold et al.

(10) Patent No.: US 7,610,475 B2
(45) Date of Patent: Oct. 27, 2009

(54) PROGRAMMABLE LOGIC CONFIGURATION FOR INSTRUCTION EXTENSIONS

(75) Inventors: Jeffrey Mark Arnold, San Diego, CA (US); Gareld Howard Banta, Atherton, CA (US); Scott Daniel Johnson, Mountain View, CA (US); Albert R. Wang, Los Altos, CA (US)

(73) Assignee: Stretch, Inc., Sunnyvale, CA (US)

( * ) Notice: Subject to any disclaimer, the term of this patent is extended or adjusted under 35 U.S.C. 154(b) by 793 days.

(21) Appl. No.: 11/204,555

(22) Filed: Aug. 15, 2005

(65) Prior Publication Data
US 2005/0273581 A1 Dec. 8, 2005

Related U.S. Application Data

(63) Continuation of application No. 10/732,392, filed on Dec. 9, 2003, now Pat. No. 6,954,845, which is a continuation-in-part of application No. 10/630,542, filed on Jul. 29, 2003, now Pat. No. 7,373,642.

(51) Int. Cl.
*G06F 9/30* (2006.01)
(52) U.S. Cl. .......................... 712/244; 712/36; 712/200
(58) Field of Classification Search .................. 712/36, 712/200, 244; 345/501, 522
See application file for complete search history.

(56) References Cited

U.S. PATENT DOCUMENTS

| | | | |
|---|---|---|---|
| 4,635,261 A | 1/1987 | Anderson et al. | |
| 4,766,569 A | 8/1988 | Turner et al. | |
| 4,766,659 A | 8/1988 | Cronenwett et al. | |
| 4,893,311 A | 1/1990 | Hunter et al. | |
| 5,055,997 A | 10/1991 | Sluijter | |
| 5,247,689 A | 9/1993 | Ewert | |
| 5,258,668 A | 11/1993 | Cliff et al. | |
| 5,260,610 A | 11/1993 | Pedersen et al. | |
| 5,260,611 A | 11/1993 | Cliff et al. | |
| 5,274,581 A | 12/1993 | Cliff et al. | |
| 5,274,782 A | 12/1993 | Chalasani | |

(Continued)

FOREIGN PATENT DOCUMENTS

EP 0 507 507 A2 10/1992

(Continued)

OTHER PUBLICATIONS

Hauck et al., "The Chimaera Reconfigurable Functional Unit", Proceedings of the 5th Annual Symposium on FPGAs for Custom Computing Machines, Apr. 16-18, 1997, IEEE, pp. 87-96.*

(Continued)

*Primary Examiner*—William M Treat
(74) *Attorney, Agent, or Firm*—Carr & Ferrell LLP

(57) ABSTRACT

A processing system with reconfigurable instruction extensions includes a processor, programmable logic, a register file, and a load/store module. The processor executes a computer program comprising a set of computational instructions and at least one instruction extension. The programmable logic receives configuration information to configure the programmable logic for the instruction extension and executes the instruction extension. The register file is coupled to the programmable logic and stores data. The load/store module transfers the data directly between the register file and a system memory.

12 Claims, 10 Drawing Sheets

U.S. PATENT DOCUMENTS

| | | | |
|---|---|---|---|
| 5,293,489 A | 3/1994 | Furui et al. |
| 5,299,317 A | 3/1994 | Chen |
| 5,343,406 A | 8/1994 | Freeman et al. |
| 5,357,152 A | 10/1994 | Jennings, III et al. |
| 5,361,373 A | 11/1994 | Gilson |
| 5,414,377 A | 5/1995 | Freidin |
| 5,426,378 A | 6/1995 | Ong |
| 5,436,574 A | 7/1995 | Veenstra |
| 5,471,628 A | 11/1995 | Phillips |
| 5,488,612 A | 1/1996 | Heybruck |
| 5,517,627 A | 5/1996 | Petersen |
| 5,535,406 A | 7/1996 | Kolchinsky |
| 5,619,665 A | 4/1997 | Emma |
| 5,636,224 A | 6/1997 | Voith et al. |
| 5,652,875 A | 7/1997 | Taylor |
| 5,682,493 A | 10/1997 | Yung et al. |
| 5,684,980 A | 11/1997 | Casselman |
| 5,696,956 A | 12/1997 | Razdan et al. |
| 5,726,584 A | 3/1998 | Freidin |
| 5,742,180 A | 4/1998 | DeHon et al. |
| 5,784,636 A | 7/1998 | Rupp |
| 5,794,062 A * | 8/1998 | Baxter ..................... 712/30 |
| 5,819,064 A | 10/1998 | Razdan et al. |
| 5,822,588 A | 10/1998 | Sterling et al. |
| 5,828,835 A | 10/1998 | Isfeld |
| 5,847,578 A | 12/1998 | Noakes et al. |
| 5,850,564 A | 12/1998 | Ting |
| 5,920,202 A | 7/1999 | Young et al. |
| 5,926,036 A | 7/1999 | Cliff et al. |
| 5,943,150 A | 8/1999 | Deri |
| 5,956,518 A | 9/1999 | DeHon et al. |
| 5,963,050 A | 10/1999 | Young et al. |
| 5,977,793 A | 11/1999 | Reddy et al. |
| 5,982,195 A | 11/1999 | Cliff et al. |
| 5,986,465 A | 11/1999 | Mendel |
| 5,999,734 A | 12/1999 | Willis et al. |
| 6,026,478 A | 2/2000 | Dowling |
| 6,092,174 A | 7/2000 | Roussakov |
| 6,167,502 A | 12/2000 | Pechanek |
| 6,219,628 B1 | 4/2001 | Kodosky et al. |
| 6,237,079 B1 | 5/2001 | Stoney |
| 6,292,388 B1 | 9/2001 | Camarota |
| 6,343,337 B1 | 1/2002 | Dubey |
| 6,353,841 B1 | 3/2002 | Marshall et al. |
| 6,374,403 B1 | 4/2002 | Darte |
| 6,415,424 B1 | 7/2002 | Arimilli et al. |
| 6,418,045 B2 | 7/2002 | Camarota |
| 6,426,648 B1 | 7/2002 | Rupp |
| 6,467,009 B1 | 10/2002 | Winegarden |
| 6,505,241 B2 | 1/2003 | Pitts |
| 6,557,092 B1 | 4/2003 | Callen |
| 6,622,233 B1 | 9/2003 | Gilson |
| 6,633,181 B1 | 10/2003 | Rupp |
| 6,698,015 B1 | 2/2004 | Moberg et al. |
| 6,721,866 B2 | 4/2004 | Roussel |
| 6,721,884 B1 | 4/2004 | De Oliveira Kastrup Pereira et al. |
| 6,732,354 B2 | 5/2004 | Ebeling et al. |
| 6,744,274 B1 | 6/2004 | Arnold et al. |
| 6,795,900 B1 | 9/2004 | Miller et al. |
| 6,799,236 B1 | 9/2004 | Dice et al. |
| 6,817,013 B2 | 11/2004 | Tabata et al. |
| 6,831,690 B1 | 12/2004 | John |
| 6,857,110 B1 | 2/2005 | Rupp et al. |
| 6,874,110 B1 | 3/2005 | Camarota |
| 6,883,084 B1 | 4/2005 | Donohoe |
| 6,954,845 B2 | 10/2005 | Arnold et al. |
| 6,968,544 B1 | 11/2005 | Schneider |
| 6,986,127 B1 | 1/2006 | Newlin |
| 6,996,709 B2 | 2/2006 | Arnold |
| 7,000,211 B2 | 2/2006 | Arnold |
| 7,062,520 B2 | 6/2006 | Rupp |
| 7,086,047 B1 | 8/2006 | Edwards |
| 7,178,062 B1 | 2/2007 | Dice |
| 7,254,142 B2 | 8/2007 | Hagsand |
| 7,269,616 B2 | 9/2007 | Rupp |
| 7,350,054 B2 | 3/2008 | Furuta |
| 7,373,642 B2 | 5/2008 | Williams |
| 7,412,684 B2 | 8/2008 | Gutberlet |
| 2001/0049816 A1 | 12/2001 | Rupp |
| 2003/0046513 A1 | 3/2003 | Furuta |
| 2003/0097546 A1 | 5/2003 | Taylor |
| 2003/0108119 A1 | 6/2003 | Mohebbi et al. |
| 2003/0196058 A1 | 10/2003 | Ramagopal et al. |
| 2004/0019765 A1 | 1/2004 | Klein, Jr. |
| 2004/0193852 A1 | 9/2004 | Johnson |
| 2004/0208602 A1 | 10/2004 | Plante |
| 2005/0166038 A1 | 7/2005 | Wang et al. |

FOREIGN PATENT DOCUMENTS

| | | |
|---|---|---|
| EP | 0507507 | 10/1992 |
| EP | 0 668 659 A2 | 8/1995 |
| EP | 0668659 | 8/1995 |
| EP | 1 443 417 | 8/2004 |
| EP | 1443417 A1 | 8/2004 |
| TW | 152355 | 7/2002 |
| TW | 152994 | 7/2002 |
| TW | 168210 | 4/2003 |

OTHER PUBLICATIONS

Lu et al., "The MorphoSys Dynamically Reconfigurable System-On-Chip", Proceedings of the First NASA/DoD Workshop on Evolvable Hardware, IEEE, Jul. 19-22, 1999, pp. 152-160.*

U.S. Appl. No. 10/630,542, Albert Wang, Defining Instruction Extensions in a Standard Programming Language, filed Jul. 29, 2003.

U.S. Appl. No. 10/404,706, Scott D. Johnson, Extension Adapter, filed Mar. 31, 2003.

U.S. Appl. No. 11/099,280, Jeffrey Mark Arnold, Video Processing System with Reconfigurable Instructions, filed Apr. 4, 2005.

Ye et al., "CHIMAERA: A High-Performance Architecture with a Tightly-Coupled Reconfigurable Functional Unit", Proceedings of the 27th International Symposium on Computer Architecture, IEEE, Jun. 10-14, 2000, pp. 225-235.

"MIPS Extension for Digital Media with 3D," MIPS Technologies, Inc., Dec. 27, 1996.

Borgatti, M. et al., "A Reconfigurable System Featureing Dynamically Extensible Embedded Microprocessor, FPGA and Customisable I/O," IEEE 2002 Custom Integrated Circuits Conference, 2002, pp. 1-4.

Razdan, R. et al., "A High-Performance Microarchitecture with Hardware-Programmable Functional Units," Proc. of Micro-27, Nov. 1994.

Bechade, R. A. et al., "Programmable Arithmetic/Logic Circuits," IBM Technical Disclosure Bulletin, U.S. IBM Corp., New York, vol. 3, No. 11, Apr. 1981, pp. 4870-4873, XP-000713711.

Beeck et al., "CRISP: A Template for Reconfigurable Instruction Set Processors," FPL 2001, LNCS 2147, pp. 296-305, Springer-Verlag Berlin Heidelberg, 2001.

Bechade et al., "Programmable Arithmetic/Logic Circuits," IBM Technical Disclosure Bulletin, U.S. IBM Corp., New York, vol. 3, No. 11, Apr. 1981, pp. 4870-4873, XP-000713711.

DeHon, Andre, "Transit Note #118 Notes on Coupling Processors with Reconfigurable Logic," M.I.T. Transit Project, Last Updated Mar. 21, 1995.

Tanenbaum, Andrew S., "Modern Operating Systems," 2001, 2nd edition, Prentice Hall, New Jersey, p. 31.

Hennessy, John L. and David A. Patterson, "Computer Organization and Design: The Hardware/Software Interface," 1998, 2nd edition, Morgan Kaufmann Publishers, Inc., San Francisco, CA, p. 345.

Lee, K.C., "A Virtual Bus Architecture for Dynamic Parallel Processing," Feb. 1993, IEEE Transactions on Parallel and Undistributed Systems, vol. 4, No. 2, pp. 121-130.

Goldblatt, Kim, "The Low-Cost, Efficient Serial Configuration of Spartan FPGAs," Nov. 13, 1998, XAPP098 (Version 1.0), Xilinx.

Scott, Steven L. and Gregory M. Thorson, "The Cray T3E Network: Adaptive Routing in a High Performance 3D Torus," Aug. 15-16, 1996, Hot Interconnects IV, Stanford University.

Golestani, S. Jamaloddin, "A Sto-and-Go Queuing Framework for Congestion Management," 1990, Proc. of the ACM Symposium on Communications Architectures & Protocols, ACM Press, New York, NY, pp. 8-18.

Dally, William J. and Charles L. Seitz, "Deadlock Free Message Routing in Multiprocessor Interconnection Networks," May 10, 1985, Computer Science Department, California Institute of Technology.

Garlan, David and Mary Shaw, "An Introduction to Software Architecture," Jan. 1994, CMU-CS-94-166, School of Computer Science, Carnegie Mellon University, Pittsburgh, PA.

Intel and Hewlett-Packard, "IA-64 Application Instruction Set Architecture Guide," Revision 1.0, 1999, pp. C-1 through C.

Hwang, Kai, "Advanced Computer Architecture: Parallelism, Scalability, Programmability," 1993, McGraw Hill, pp. 182-183.

Ye, Z.A. et al., "CHIMAERA: a high-performance architecture with a tightly-coupled reconfigurable functional unit," Jun. 10-14, 2000, Proc. of the 27th International Symposium on Computer Architecture, pp. 225-235.

MIPS Technologies, Inc., "MIPS Extension for Digital Media with 3D," 1996, pp. 1-26.

Borgatti, Michele et al., "A Reconfigurable System featuring Dynamically Extensible Embedded Microprocessor, FPGA and Customisable I/O," 2002, IEEE Custom Integrated Circuits Conference, pp. 1-4.

Razdan, Rahul and Michael D. Smith, "A High-Performance Michroarchitecture with Hardware-Programmable Functional Units," Nov. 1994, Proc. of Micro-27, pp. 1-9.

U.S. Appl. No. 10/630,542, Kenneth Williams, Defining Instruction Extensions in a Standard Programming Language, filed Jul. 29, 2003.

U.S. Appl. No. 10/394,824, Charle' Rupp, Transitive Processing Unit for Performing Complex Operations, filed Mar. 21, 2003.

U.S. Appl. No. 10/686,882, Kenneth Williams, Instruction Set for Efficient Bit Stream and Byte Stream I/O, filed Oct. 15, 2003.

U.S. Appl. No. 10/750,714, Ricardo Gonzalez, Systems and Methods for Software Extensible Multi-Processing, filed Dec. 31, 2003.

U.S. Appl. No. 10/815,453, Ricardo Gonzalez, Configuring a Multi-Processor System, filed Mar. 31, 2004.

U.S. Appl. No. 11/021,247, Ricardo Gonzalez, Systems and Methods for Selecting Input/Output Configuration in an Integrated Circuit, filed Dec. 21, 2004.

U.S. Appl. No. 11/129,146, Ricardo Gonzalez, Long Instruction Word Processing with Instruction Extensions, filed May 12, 2005.

U.S. Appl. No. 11/099,280, Jeffrey M. Arnold, Video Processing System with Reconfigurable Instructions, filed Apr. 4, 2005.

U.S. Appl. No. 11/204,555, Jeffrey M. Arnold, Programmable Logic Configuration for Instruction Extensions, filed Aug. 15, 2005.

Rupp et al.; U.S. Appl. No. 10/746,018 entitled "Architecture and Method for Reconfigurable Data Path Processing" filed Dec. 23 2003.

Barat Francisco et al. "Reconfigurable Instruction Set Processors: A Survey" IEEE 2000 0-7695-0688-2/00.

Borkar Shekhar et al. "iWarp: An Integrated Solution to High-Speed Parallel Computing" IEEE 1998 pp. 330-339.

Carrillo et al.; "The Effect of Reconfigurable Units in Superscalar Processors" 2001; ACM.

Diniz et al. "Automatic Synthesis of Data Storage and Control Structures for FPGA-based Computing Engines" 2000 IEEE pp. 91-100.

Gonzalez "Xtensa: A Configurable and Extensible Processor" Mar.-Apr. 2000 IEEE Micro pp. 60-70.

Jacob et al; "Memory Interfacing and Instruction Specification ofr Reconfigurable Processors" 1999; ACM.

Taylor Michael Bedford et al. "The Raw Microprocessor: A Computational Fabric for Software Circuits and General-Purpose Programs" Microarchitecture IEEE Micro Mar.-Apr. 2002 pp. 25-35.

Waingold Elliot et al. "Baring It All to Software: Raw Machines" Computer Sep. 1997 IEEE pp. 86-93.

http://www.tensilica.com/products/xtensa_overview.htm Xtensa Processor Overview.

Xilinx, "Virtex™ 2.5 V Field Programmable Gate Arrays, Product Specification," DS003-2 (v2.8.1) Dec. 9, 2002, pp. 1-20.

Michael J. Wirthlin et al., "DISC: The dynamic instruction set computer," Proceedings SPIE, Field Programmable Gate Arrays (FPGAs) for Fast Board Development and Reconfigurable Computing, Oct. 25-26, 1995, 14 pages.

* cited by examiner

PROGRAMMABLE LOGIC CONFIGURATION FOR INSTRUCTION EXTENSIONS

CROSS-REFERENCE TO RELATED APPLICATIONS

This application is a continuation of U.S. application Ser. No. 10/732,392 filed on Dec. 9, 2003 now U.S. Pat. No. 6,954,845 and entitled "Reconfigurable Instruction Set Computing," which is a continuation-in-part of U.S. application Ser. No. 10/630,542 filed on Jul. 29, 2003 now U.S. Pat. No. 7,373,642 and entitled "Defining Instruction Extensions in a Standard Programming Language", which are both hereby incorporated by reference. The subject matter of this application is related to U.S. application Ser. No. 10/404,706 filed on Mar. 31, 2003 and titled "Extension Adapter", which is incorporated herein by reference.

BACKGROUND OF THE INVENTION

1. Field of the Invention

The present invention relates generally to the field of programmable computer processors, and more particularly to programmable logic configuration for instruction extensions.

2. Description of the Prior Art

Computer processors can generally be sorted into two classes: general purpose processors that can be adapted to a multitude of applications; and application-specific processors that are optimized to serve specific applications. General purpose processors are designed to run a general instruction set, namely a set of instructions that the processor will recognize and execute. Such general instruction sets tend to include a large number of instructions in order to support a wide variety of programs.

Application-specific processors are designed to run a more limited instruction set, where the instructions are more tailored or specific to the particular application. While an application-specific processor can enable certain programs to execute much faster than when run on a general purpose processor, they are by definition more limited in functionality due to the limited instruction sets they run.

Before the application-specific processor is manufactured, instructions may be added to extend the application-specific processor's instruction set. In one example, instructions may be added using a Tensilica Instruction Extension (TIE) language and a TIE compiler from Tensilica, Inc. of Santa Clara, Calif. A designer defines the new instruction in the TIE language by specifying the characteristics of the instruction such as the field, the opcode, and the operands. A TIE compiler then compiles the source code in the TIE language for the new instruction for simulation, verification, and creation of the necessary files such as dynamic linked libraries.

One problem with the TIE language and the TIE compiler is that instructions can only be added prior to the fabrication of the processor. This time period before fabrication is also known as "pre-silicon." The time period after fabrication is known as "post-silicon." One problem with the TIE language and the TIE compiler is the instruction set of the processor cannot be extended to include new instructions during this post-silicon period. Furthermore, another problem with the TIE language and the TIE compiler is during this post-silicon period, the characteristics of the instructions cannot be changed or modified. Therefore, during this post-silicon period, the processor is limited only to a finite set of instructions defined in the pre-silicon period and limited to the characteristics of the instructions defined in the pre-silicon period.

Some systems have used programmable logic devices (PLD) with processors. One example of a programmable logic device is a field-programmable gate array (FPGA). One prior art system called Garp includes a MIPS processor with reconfigurable hardware that are both located on the same die. This Garp system uses a co-processor model of communication between the processor and the reconfigurable array. The reconfigurable hardware in this Garp system is an FPGA that acts as a slave computational unit to the MIPS processor, where the MIPS processor would explicitly hand control to the reconfigurable array and wait until the array task is completed. Although the reconfigurable array and the MIPS processor share a common path to a cache and memory, there is no direct connection between the processor's data path and the array. This Garp system is described in a publication entitled "Garp: A MIPS Processor with a Reconfigurable Coprocessor" by John R. Hauser and John Wawrzynek.

One example of an FPGA is manufactured by Altera in San Jose, Calif. Another example of an FPGA is a Virtex-II Pro (V2Pro) FPGA manufactured by Xilinx in San Jose, Calif. This V2Pro FPGA uses a more loosely coupled model of communication in which the FPGA appears as a memory mapped peripheral to the processor(s).

One problem with the Garp system and the V2Pro FPGA is the cost of initiating a computation in the programmable fabric. In both the Garp system and the V2Pro FPGA, the processor must execute several instructions to initiate a co-processor computation, which adds overhead to initiate an extension instruction. Also, the processor must wait for the co-processor computation to complete, which prevents other instructions from being executed.

Accordingly, what is desired is the ability to write a program in a convenient programming language and to extend an instruction set of a computer processor with instructions tailored to that program so that the program can execute on that computer processor more efficiently.

SUMMARY OF THE INVENTION

A processing system with reconfigurable instruction extensions includes a processor, programmable logic, a register file, and a load/store module. The processor executes a computer program comprising a set of computational instructions and at least one instruction extension. The programmable logic receives configuration information to configure the programmable logic for the instruction extension and executes the instruction extension. The register file is coupled to the programmable logic and stores data. The load/store module transfers the data directly between the register file and a system memory.

Configuring the programmable logic may be by means of: static configuration by the compiler before execution of the computer program in the processor; explicit configuration while the application executes; or implicit configuration wherein an extension adapter detects instruction extensions and configures the programmable logic. The extension adapter determines whether the programmable logic device is already configured to execute the instruction extension, obviating unneeded reconfiguration.

A method for operating a processing system with reconfigurable instruction extensions includes executing a computer program comprising a set of computational instructions and at least one instruction extension and receiving configuration information into programmable logic to configure the programmable logic for the instruction extension. The method also includes executing the instruction extension in the programmable logic. The method further includes storing data in a register file coupled to the programmable logic and transferring the data directly between the register file and a system memory using a load/store module.

A further understanding of the nature and advantages of the inventions herein may be realized by reference to the remaining portions of the specification and the attached drawings.

DETAILED DESCRIPTION OF THE INVENTION

The present invention provides a method for extending a processor instruction set to include new, extended instructions and for replacing a critical code segment of a computer program with a function that causes the new instruction to execute. As general purpose processors typically do not have programmable instruction sets, the present invention will be described with reference to the programmable processing hardware of FIG. 1, though it will be appreciated that the invention is not so limited and can be used in conjunction with other suitable programmable processing hardware.

Figure 1:
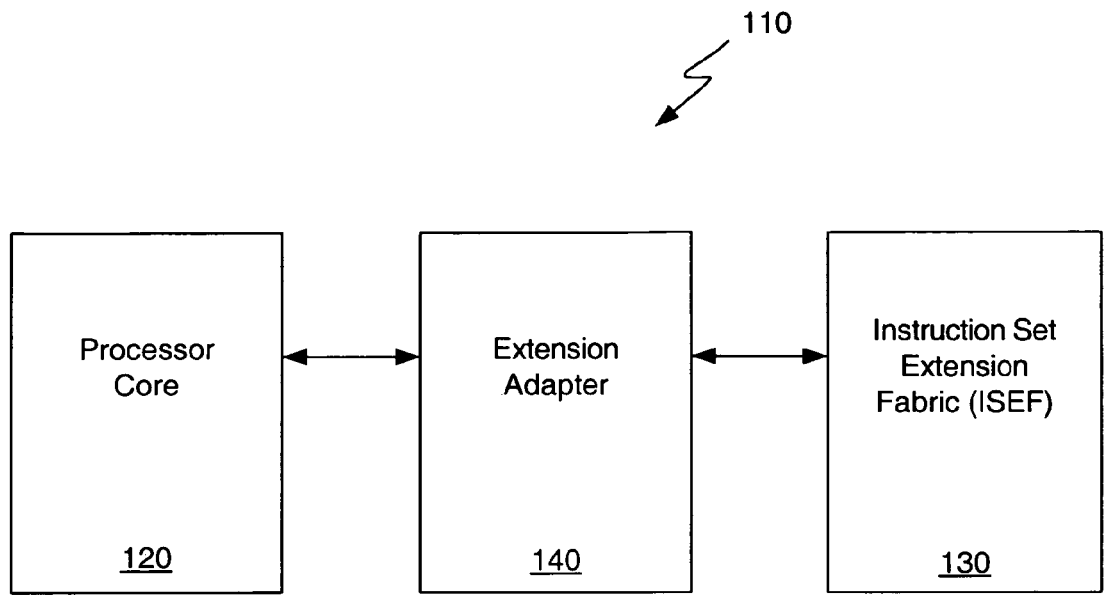
FIG. 1 is a schematic diagram of an exemplary extensible processor system of the present invention.

FIG. 1 is a schematic drawing of an exemplary programmable processing system 110 in an exemplary implementation of the invention. The programmable processing system includes a processor core 120, an Instruction Set Extension Fabric (ISEF) 130, and an extension adapter 140 that couples the ISEF 130 to the processor core 120. The processor core 120 can include optional features such as coprocessors, write buffers, exception handling features, debug handling features, read only memory (ROM), etc. In some embodiments, the processor core 120 can include multiple processor cores. The processor core 120 provides standard processing capabilities such as a standard (native) instruction set that provides a set of instructions that the processor core 120 is designed to recognize and execute. Typical instructions include arithmetic functions such as add, subtract, and multiply, as well as load instructions, store instructions, and so forth. These instructions are hard-coded into the silicon and cannot be modified. One example of a suitable processor core 120 is the Xtensa® V (T1050) processor, from Tensilica, Inc., of Santa Clara, Calif.

Instruction Set Extension Fabric (ISEF) 130 includes programmable logic for enabling application-specific instructions ("instruction extensions") to be stored and executed. The Instruction Set Extension Fabric 130 is a type of programmable logic device. Because it is programmable, the instruction set of Instruction Set Extension Fabric 130 can be readily configured to include instruction extensions that are tailored to a specific application. In some embodiments the programmable logic device (ISEF) 130 runs at a slower clock speed than processor core 120. In these embodiments the cycle length of the programmable logic device 130 can be a multiple of the clock cycle of the processor core 120.

Extension adapter 140 provides an interface between the Instruction Set Extension Fabric 130 and the processor core 120. Extension adapter 140 receives instructions and determines whether the instructions should be directed to the Instruction Set Extension Fabric 130 or the processor core 120. In some embodiments extension adapter 140 provides an interface between a plurality of Instruction Set Extension Fabrics 130 and processor cores 120. Extension adapter 140 can be implemented, for example, in Application Specific Integrated Circuit (ASIC) logic. In some embodiments, extension adapter 140 may be integrated within processor core 120 or ISEF 130.

Extension adapter 140 in combination with ISEF 130 provide logic that allows users to extend the native instruction set defined by the processor core 120. It is noteworthy that the extended instruction execution itself is implemented in one or more of Instruction Set Extension Fabrics 130. Extension adapter 140 interfaces one or more Instruction Set Extension Fabrics 130 to one or more processor core 120 and controls dataflow.

Instruction Set Extension Fabric

Figure 2:
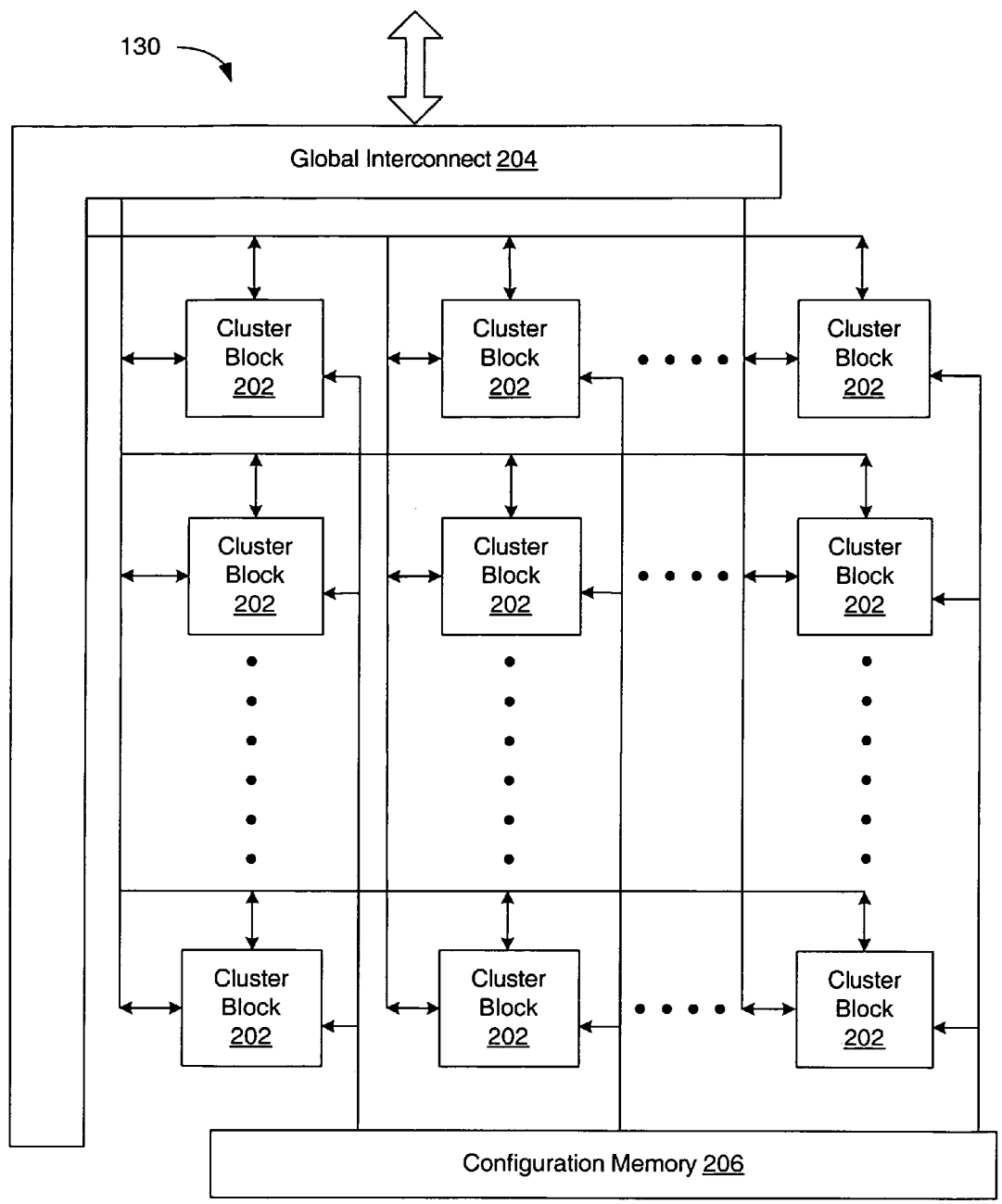
FIG. 2 is a schematic diagram of an Instruction Set Extension Fabric (ISEF) in accordance with the schematic of FIG. 1.

FIG. 2 illustrates one embodiment of an Instruction Set Extension Fabric (ISEF)130. As shown, ISEF 130 includes a plurality of cluster blocks 202 arranged in rows and columns. Data is communicated between cluster blocks 202 by means of a global interconnect 204. As shown, the global interconnect 204 also communicates data and dynamic configuration information used or output by ISEF 130 with other devices including extension adapter 140, which data and dynamic configuration information will be described in more detail below. Although generically shown as permitting any two cluster blocks 202 in ISEF 130 to communicate directly with each other via global interconnect 204, such interconnections need not be so limited. For example, only cluster blocks 202 can additionally or alternatively have interconnections such that blocks in adjacent rows and/or columns communicate directly with each other.

Although not necessarily part of ISEF 130, and preferably separately provided, also shown is configuration memory 206. Configuration memory 206 stores static configurations for ISEF 130. The term "memory" is not intended to be construed as limiting. Rather, configuration memory 206 can have various implementations including CMOS static random access memory (SRAM), fused links and slow speed electrically erasable read only memory (EEPROM).

Figure 3:
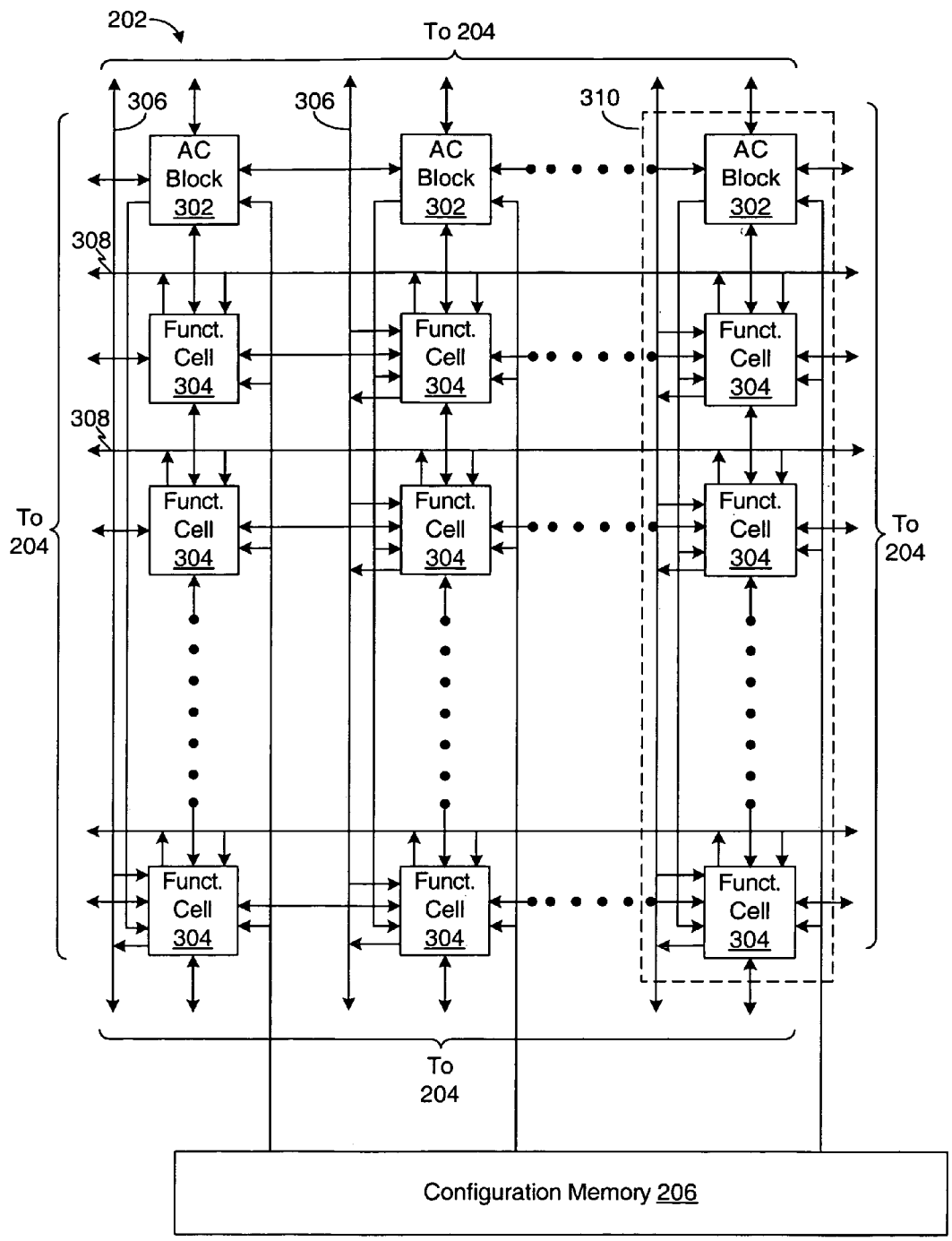
FIG. 3 illustrates an example of the cluster block implementation illustrated in FIG. 2.

FIG. 3 illustrates a cluster block arrangement that can be used to implement cluster block 202 in FIG. 2. As shown, it includes a plurality of ALU controller (AC) blocks 302 and function cells 304. The AC blocks 302 provide configuration signals for a respective column 310 of function cells 304. In one example of the invention, cluster block 202 includes four columns of four function cells 304, each column including one AC block 302.

FIG. 3 shows paths for sharing data and dynamic configuration information between vertically or horizontally adjacent function cells 304 within cluster block 202, and with other cluster blocks via global interconnect 204. Also shown are horizontal word lines 308 and vertical word lines 306, by which certain or all of the interior function cells 304 may communicate data with other cluster blocks 202, which word lines partially implement global interconnect 204.

One example of the Instruction Set Extension Fabric 130 is described in more detail in U.S. Patent Publication Number US 2001/0049816, which is incorporated herein by reference. A suitable Instruction Set Extension Fabric 130 is available from Stretch, Inc., of Mountain View, Calif.

Extension Adapter

Figure 4:
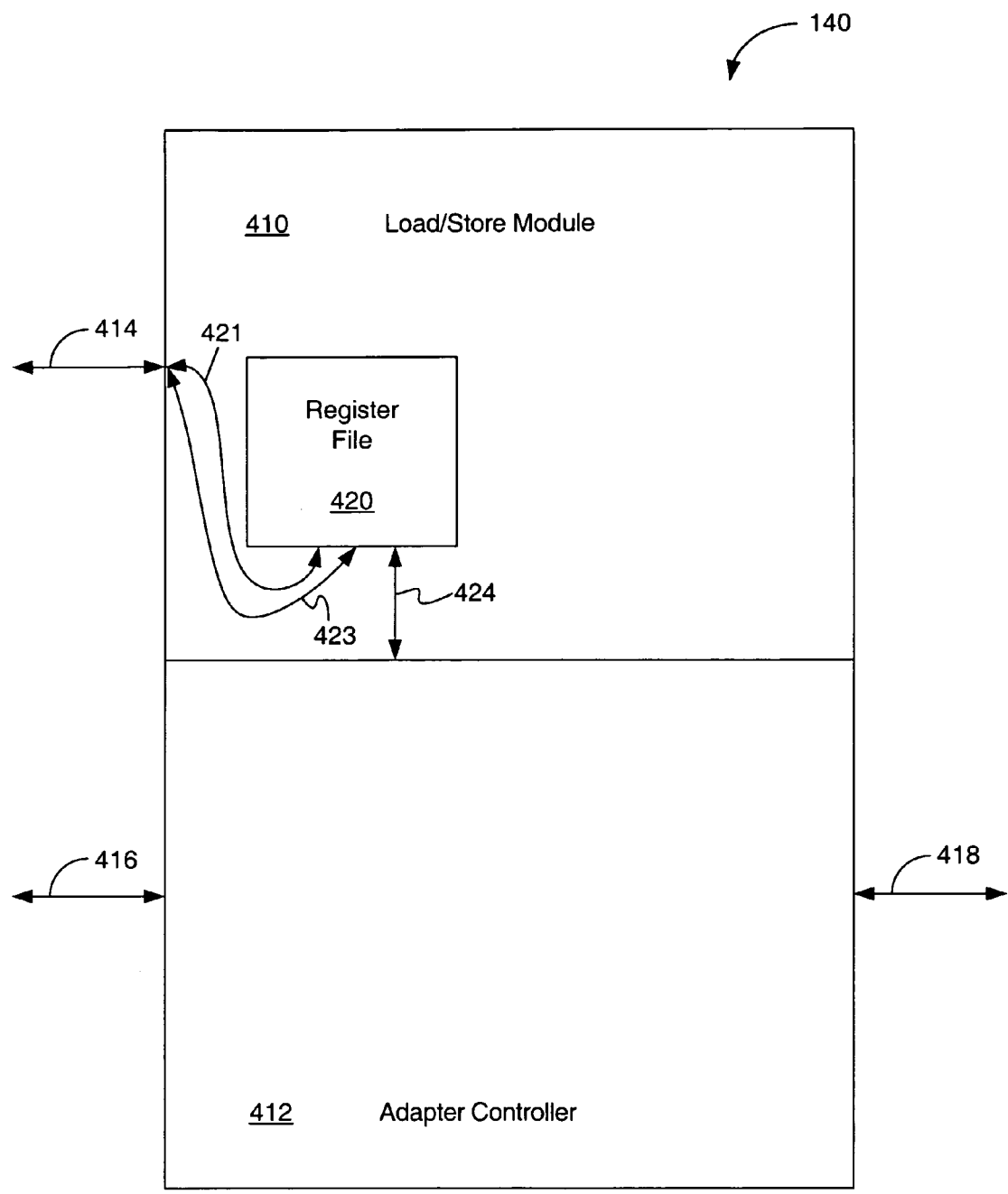
FIG. 4 is a schematic diagram illustrating details of the extension adapter of FIG. 1, in accordance with an embodiment of the present invention.

Referring to FIG. 4, extension adapter 140 is shown in greater detail. In one embodiment, extension adapter 140 comprises load/store module 410 and adapter controller 412. In another embodiment, processor core 120, and not extension adapter 140, comprises load/store module 410.

Load/store module 410 can be created via a compiler, such as, for example, the Tensilica Instruction Extension (TIE) compiler, which can be obtained from Tensilica, Inc., of Santa Clara, Calif. TIE is a language that allows a user to describe the functionality of new extended instructions. A designer uses TIE to create a standard set of functions that extend the normal functionality of processor core 120. The TIE code that a designer writes describes the functionality of a series of resources that aid in the interface between processor core 120 and extension adapter 140. Extension adapter 140 functions such that processor core 120 treats user-defined post-silicon, extended instructions as if they were native instructions to the processor core 120. In some embodiments, the extended instruction includes at least one new instruction added post-silicon and a set of pre-silicon instructions.

Load/store module 410 interfaces with processor core 120 via interface 414. Register file 420 is coupled to interface 414 via processor control and data interface 421 and via ISEF control and data interface 423. Adapter controller 412 interfaces with processor core 120 via interface 416. Adapter controller 412 interfaces with ISEF 130 via interface 418.

In an exemplary embodiment according to the present invention, load/store module 410 comprises register file 420. Register file 420 is a register file, or collections of registers, that is added by using, for example, the TIE compiler. Register file 420 interfaces with adapter controller 412 via interface 424. In one embodiment, register file 420 is 128 bits wide. In another embodiment, register file 420 is 64 bits wide. However, register file 420 can be of varying widths. It is contemplated that the system can comprise one or more than one register file 420. Adapter controller 412 accesses register file 420. Adapter controller 412 is then used to interface with ISEF 130.

Load/store module 410 provides fixed instruction functionality. A set of fixed instructions includes instructions for moving data to and from external memory (not shown), into and out of register file 420. This collection of functionality is defined in one embodiment in the TIE language, and is implemented through Tensilica's TIE compiler. It is contemplated that languages other than TIE can be used with the present system. Load/store module 410 contains one or more register files 420 and a set of fixed instructions that give register files 420 access to external memory via load and store instructions. Again, these instructions will be fixed once the silicon is created, and are fully implemented using the standard TIE flow. It is a function of the extension adapter 140 to encapsulate the fixed functionality and manage it with the configurable interface logic.

A purpose of load/store module 410 includes defining the functionality of register file 420, which is temporary storage for data that is going to be transferred between processor core 120 and ISEF 130. Load/store module 410 defines not only register file 420, but also defines how to load and store generic instructions (e.g., Tensilica instructions) of processor core 120 into register file 420. Adapter controller 412 performs the function of interfacing with register file 420. Adapter controller 412 also receives the data from register file 420 and interfaces register file 420 with ISEF 130.

In one exemplary methodology, standard load and store instructions are used to move data to and from register file 420. Load instructions issued by the extension adapter 140 retrieve data from memory into register file 420. ISEF 130 instructions operate under the control of extension adapter 140 to retrieve stored data from register file 420 to ISEF 130 for use in ISEF 130 computations or other functional execution. Data resulting from ISEF 130 instruction execution is then returned to register file 420, where store instructions move data from register file 420 to memory via interface 414.

ISEF 130 and adapter controller 412 allow a user to add new instructions that change with software on different implementations of the same silicon. For example, a user can add specialized instructions to perform video or audio encoding/decoding. These instructions are not hard-wired into processor core 120, but rather are implemented using the programmably configurable logic of ISEF 130. Extension adapter 140 operates as a data and control interface between processor core 120 and ISEF 130 by routing extended instructions (i.e., those instructions not part of the original processor core 120 native instruction set) to ISEF 130 for execution. Since the logic of ISEF 130 is configurable, it is entirely within the scope of the present invention that the configuration of ISEF 130 can be changed as frequently as needed to accommodate the inclusion of various extended instructions in application programs being run on the processor core 120.

In one embodiment of the present invention, the inputs and outputs to the extended instruction, as executed in ISEF 130, are limited to data transfers between a named register file 420. In some embodiments, the ISEF 130 can access a register file in the processor core 120 to allow both reading and writing. In another embodiment, in addition to the data transfers between the named register file 420, the data transfers are between an alternative source indicative of a processor state. One example of this alternative source is a special purpose register. In such an embodiment, the number of register file 420 inputs to the ISEF 130 computation is a finite number such as three (3), and the number of special purpose register inputs is eight (8) 128-bit registers.

In some embodiments, the outputs of the ISEF 130 computations are directed to register file 420, to equivalent special purpose registers, and/or by-passed to processor core 120 for use in execution of the subsequent instruction. In the above embodiment, the number of register file 420 outputs is two (2) and the number is a 128-bit special purpose register outputs is up to eight (8). The extended instruction of such an embodiment does not have direct access to data and instruction memories and caches of the processor core 120. Any data residing in the data and instruction memories or caches of processor core 120 is first brought into the register file 420 using load instructions, before being used by the extended instruction as executed in ISEF 130. In some embodiments, the data residing in the data and instruction memories or caches of processor core 120 are brought into equivalent special purpose registers in addition to the register file 420 using load instructions. Such a restriction in the I/O of the extended instruction of this embodiment enables compiler optimization and improved performance. The exact input and output dependencies of the extended instructions are programmed into the C compiler (discussed with reference to FIG. 7) used in scheduling the extended instruction and in allocating the associated register files 420.

It is noteworthy that extension adapter 140 handles the multiplexing of data among register file(s) 420 and ISEF 130. Extension adapter 140 manages the timing relationships between register reads and register writes, which are functions of instruction execution length.

It is also noteworthy that the processing system 110 comprises means for ensuring the proper configuration of ISEF 130 prior to the execution of a specific extended instruction in the ISEF 130. In one example, if the system tries to execute an instruction not included in the instruction set of processor core 120 that is not currently configured in ISEF 130, an exception is generated by the extension adapter 140, resulting in either the proper configuration signals being sent to ISEF 130, or in an alternative process, being initiated to deal with the missing configuration.

Figure 5:
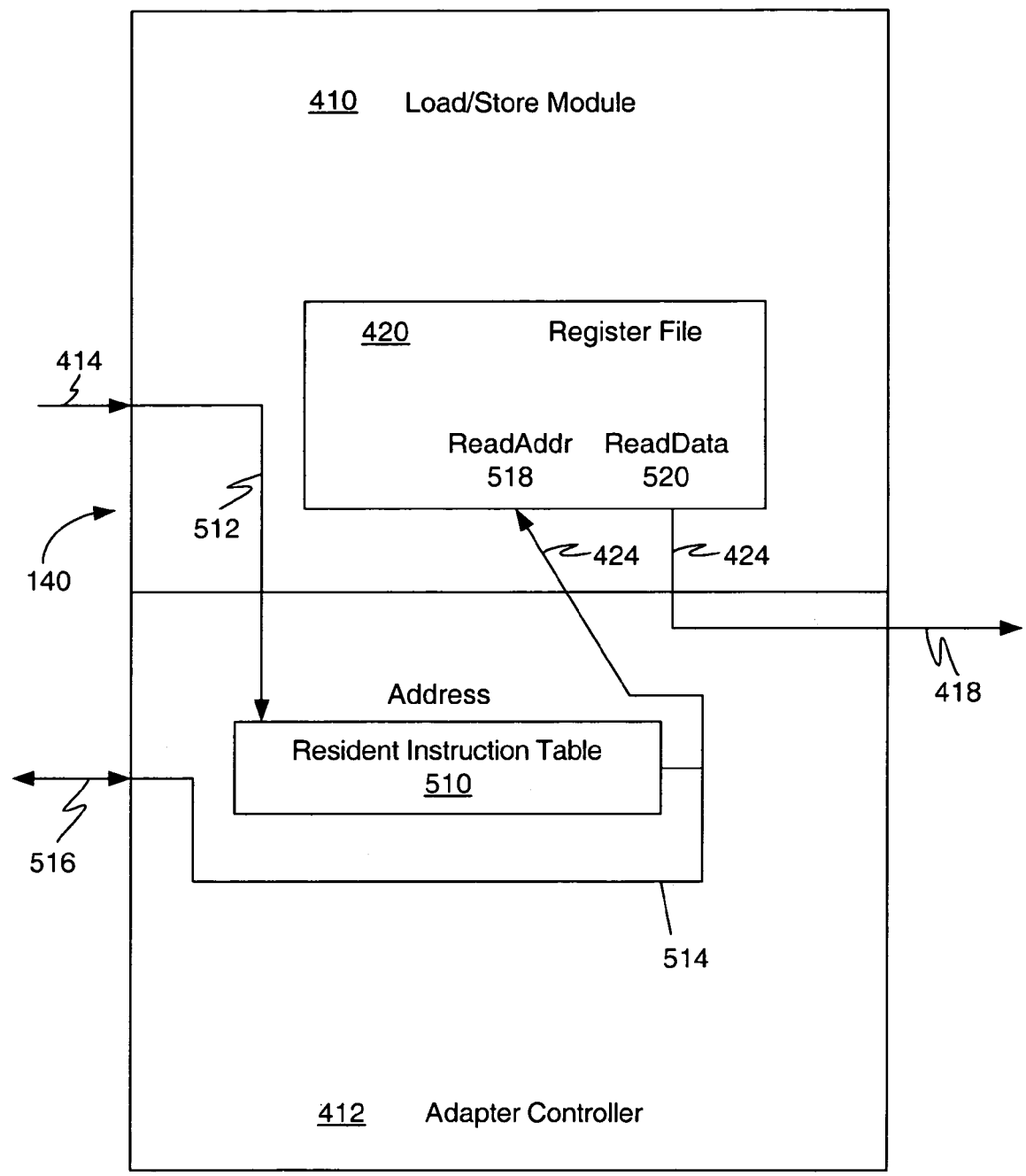
FIG. 5 is a schematic diagram illustrating an operation involving the reading of data in accordance with the extension adapter of FIG. 4.

In keeping with some embodiments according to the present invention, FIG. 5 illustrates an operation involving the reading of data. Resident instruction table 510 has a description of what extended instructions are adapted to do with respect to the interface to processor core 120. For any instruction that a user creates, those instructions should control processor core 120 in such a way that processor core 120 executes those instructions in similar fashion to native instructions included in the original processor core 120 instruction set. Resident instruction table 510 receives instruction description data 512 (from interface 414 of FIG. 4) as a sequence of binary numbers (e.g., a 24-bit sequence) that is decoded by resident instruction table 510 and converted into an address that points to a location in resident instruction table 510.

If the instruction description data 512 describes a normal add, subtract, etc. contained in the native instruction set of processor core 120, then resident instruction table 510 does not do anything with the instruction. However, if the instruction description data 512 describes an extended instruction that ISEF 130 is to execute, then resident instruction table 510 returns configuration information 514 back to processor core 120 to indicate this is a valid instruction. Extension adapter 140 will thereafter operate on the extended instruction in cooperation with ISEF 130 so that to processor core 120 it appears that the extended instruction is identical in form to a native instruction of processor core 120.

Configuration information 514 is a sequence of data from resident instruction table 510, some of which goes to processor core 120 via interface 516. Some of configuration information 514 is transmitted to the ReadAddr 518 (read address) input of register file 420 via interface 424. Data from Read-Data 520 (read data) of register file 220 is also carried on interface 424. In this example, configuration information 514 includes the address within register file 420 that an extended instruction needs to be sent to ISEF 130 via interface 418.

Compiler

Figure 6:
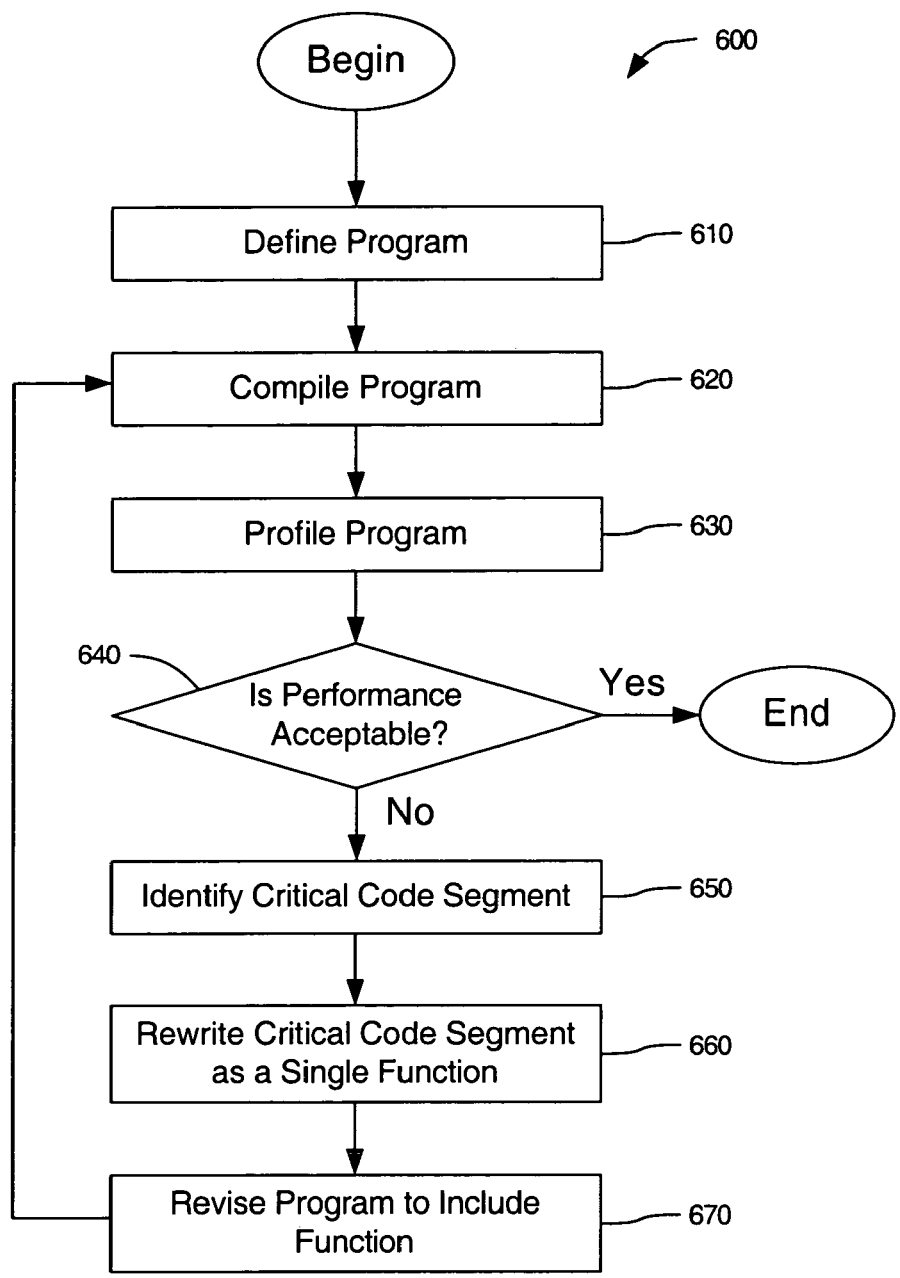
FIG. 6 is a flow chart illustrating the compiling of an application of the present invention.

FIG. 6 is a flow chart illustrating an exemplary embodiment 600 of the method of the invention. The method begins by defining a program in step 610. The program can be defined in a standard programming language that is familiar to computer programmers such as C++.

Thereafter, in step 620, the program is compiled to convert the program from the programming language in which it was written into a machine language that is recognizable by the processor core 120 (FIG. 1). It will be appreciated that the present method is intended to be iterative, as can be seen from FIG. 6, and that successive iterations initially return to step 620. Whereas in the first pass through step 620 a standard compiler, such as a C++ compiler, compiles the program, in successive iterations an additional extension compiler is also employed, as is discussed elsewhere herein. One skilled in the art can appreciate that the extension compiler can be implemented as a separate program or may be part of the compilation phase or linking phase of a standard compiler to perform the operations of the extension compiler as described herein.

Next, in step 630 the compiled program is profiled. Profiling includes executing the compiled program with representative or sample data and determining how much time would be expended executing each of the various operations of the program. Profiling in step 630 is preferably performed using a software simulation tool (not shown) that mimics the operation of the processor core 120. Such processor simulators are well known in the art, and each simulator is unique to the processor core 120 being simulated. Alternatively, profiling 630 can occur using a hardware emulator (not shown) or some combination of hardware and software. Hardware emulation is particularly useful in applications where specific timing issues are of concern to the designer.

As in step 620, because the method is iterative, the first pass through step 630 is different than in successive iterations. In the first pass through step 630 the compiled program is executed or simulated solely on the processor core 120 to provide a baseline against which improvements in successive iterations can be measured. It should be noted that some of the more time consuming operations that are typically identified by profiling involve nested loops. In some embodiments, successive programs can take advantage of the existing profiled programs by not performing step 630. Further, in some embodiments, a cache can store pre-existing blocks of code, which when matched with the compiled code, results in bypassing step 630.

In step 640 a determination is made as to the acceptability of the performance of the program. If the performance is acceptable then the method ends. Otherwise, the method continues to step 650. Generally, in the first pass through step 640 the performance will not be acceptable since no effort has yet been made to optimize the program. In successive iterations, performance can be judged against either subjective or objective standards. In some instances the program needs to be optimized so that it can return data according to the timing requirements of other programs with which it interfaces. In other instances merely a faster processing speed is desired from the program. In these latter instances, at each iteration the performance is compared to the performance from the prior iteration to determine whether the most recent iteration returned a further improvement. If no further improvement is achieved by a successive iteration, or if the improvement is sufficiently trivial, the performance is deemed to be acceptable and the method ends.

In step 650 one or more critical code segments are identified by reviewing the results of the profiling performed in step 630. A critical code segment is a portion of the program's code that took excessive time to execute or failed to meet timing requirements specified for a program in step 630. Typically, those code segments that took the longest time to execute are considered to be the most critical and are addressed first by the method. As noted elsewhere, nested loops are frequently identified as critical code segments. If addressing the most critical code segments does not produce acceptable performance in step 640, then in successive iterations the next most critical code segments are identified in step 650.

Next, in step 660, the critical code segment identified in step 650 is preferably rewritten as a separate function. An example is illustrative of this process. The following original code segment written in C++ includes a nested loop as the critical code segment:

a=0
for (i=0; i<100; i ++)
{for (j=0;j<8;j ++)
{a+=x[i+j]* y[j];}
z[i]=a>>k;}

The critical code segment can be rewritten as a function, which in the following example is given the name "inner":

int inner (short*x, short*y)
{for (j=0; j<8; j ++)
{a+=x[j]* y[j];}
return a>>k;}

Advantageously, the function can be written using the same programming language as before. In some embodiments the function does not have to be written from scratch but can instead be selected from a class library (not shown) of pre-defined functions. A class library of pre-defined functions can include functions that might be particularly useful in a certain type of application, such as functions for working with pixel data in video processing applications.

In an alternative embodiment, in step 660, markers (in C programming, such markers are conventionally referred to as PRAGMAS) are used to demark the beginning and ending of a section of code to be rewritten. Once identified, the demarked section of code is replaced by one, or alternatively, multiple instructions. It should be apparent to those of ordinary skill in the art that the rewriting step of 660 can be performed either manually, or by using an automated conversion tool. Such a conversion tool would be similar to a decompiler; rather than compiling a high level instruction into multiple lower level instructions as in a compiler, the automated conversion tool would convert multiple lower level instructions of the processor core 120 instruction set into one or more complex extended instructions for implementation in ISEF 130.

Once the critical code segment has been rewritten as a function in step 660, in step 670 the program is revised. The revision includes two operations, designating the function as a code segment to be compiled by an extension compiler and replacing the critical code segment with a statement that calls the function. In some embodiments the function is placed into an extensions file, separate from the program file, that contains the code meant to be compiled by the extension compiler. In other embodiments the function is placed in the program file and demarked in such a way that it can be recognized as intended for the extension compiler so that the standard compiler will ignore it. Demarking the function in this way can be achieved by a flag before the instruction (e.g., # pragma stretch begin) and a flag after the function (e.g., # pragma stretch end).

As noted, revising the program also includes replacing the critical code segment with a statement that calls the function. Continuing with the prior example, the original code segment that includes the critical code segment can be rewritten by replacing the critical code segment with the statement {z[i] =inner (x+i, y);} as follows:

a=0
for (i=0; i<100; i ++)
{z[i]=inner (x+i, y);}

Once the program has been revised in step 670 the method returns to step 620 and the program is again compiled. In those embodiments in which the function has been placed in the program file and demarked from the remaining code, a pre-processing tool first finds the function and copies it out to an extensions file.

Figure 7:
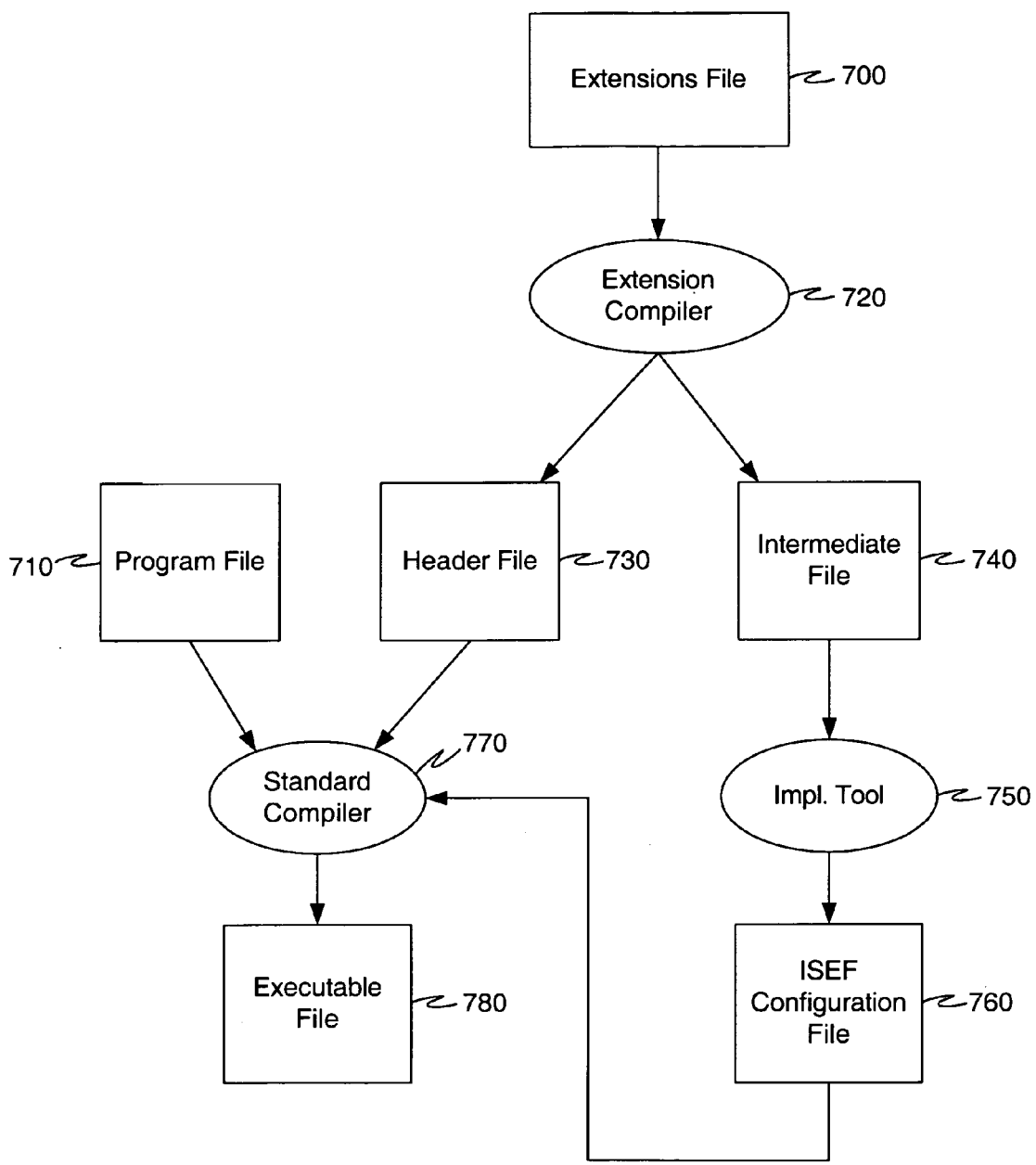
FIG. 7 is a flow chart further detailing the method of the compilation illustrated in FIG. 6.

FIG. 7 illustrates an exemplary sequence of events that occurs during step 620 to compile an extensions file 700 and a program file 710. Initially, the code in the extensions file 700 is compiled by the extension compiler 720. An example of an extension compiler 720 is Stretch C, available from Stretch, Inc. of Mountain View, Calif. The extension compiler 720 produces two outputs: a header file 730 and an intermediate file 740 written in a hardware description language such as Verilog HDL. The header file 730 declares a prototype for a specific function used to execute an extended instruction called out by the extension compiler 720 during compilation of the extensions file 700. The header file 730 is a conventional C file that provides instruction information, such as the file name, inputs required, outputs written, and other required instruction parameters. The intermediate file 740 describes how to implement an instruction in the Instruction Set Extension Fabric 130 (FIG. 1) that corresponds to the function. Next, an implementation tool 750 maps the intermediate file 740 to the Instruction Set Extension Fabric 130. More specifically, the implementation tool 750 converts the contents of the intermediate file 740 to ISEF configuration file 760. Implementation tool 750 generates ISEF configuration file 760 consisting of a bit stream that is compiled with program file 710 and header file 730 in standard compiler 770 and incorporated in the executable file 780. This ISEF configuration file 760 contains the data that is used by the executable file 780 to configure ISEF 130 in much the same way that a Field Programmable Gate Array (FPGA) is programmed.

When the extension adapter 140 encounters a processor core 120 instruction that is not part of the native set, but is rather an extended instruction generated by extension compiler 720, the processor core 120 sends a configuration bit stream to the ISEF 130 to appropriately configure the ISEF 130 to execute the extended instruction. Thus, the executable file 780 can call the function and the Instruction Set Extension Fabric 130 contains an instruction that can perform the function.

Thereafter, in step 630 the program is again profiled. In this and subsequent iterations of the method, in contrast to the first pass through step 630, the extension adapter 140 (FIG. 1) directs the Instruction Set Extension Fabric 130 to execute the instruction corresponding to the function when the function is called as the executable file 780 runs. Accordingly, the program executes more efficiently, as will be represented by the profile. Next, in step 640 the performance is again evaluated, and if acceptable the method ends, otherwise it begins a new iteration at step 650.

Returning to step 660, a critical code segment can alternatively be rewritten by selecting a pre-defined function from a class library. The following example is illustrative of pre-defined functions that might be found in a class library according to an embodiment of the present invention, and of an instruction that would be defined from these functions. Typical graphics applications define a pixel by an 8-bit integer for each of three colors such as red, green, and blue. According to the present invention, a class library for graphics applications can include a pre-defined function for red, for example, that defines an unsigned 8-bit declared integer, R, by the function se_uint<8>R; and another pre-defined function would define for the pixel an unsigned 24-bit declared integer, P, by the function se_uint<24>P=(B, G, R); where B and G correspond to blue and green, respectively. In the C++ programming language integers are generally limited to standard bit lengths such as 8, 16, 32 and 64. Accordingly, the ability to create a 24-bit integer, or any integer with a non-standard number of bits, is a beneficial feature of the present invention. Without the ability to define a pixel as a 24-bit integer, one would have to define the pixel as a 32-bit integer, but at the expense of having to carry 8 unused bits.

The advantage of not having to carry unused bits can be further seen when a number of pixels are assigned to a register with a pre-defined width. For instance, a register, W, that has a 128-bit width can accommodate four 32-bit pixels, but the same register can handle five 24-bit pixels. Expressed as an instruction for a programmable logic device 130, assigning five 24-bit pixels to register W would be expressed as WR W=(P4, P3, P2, P1, P0).

ISEF Reconfiguration

In some embodiments for ISEF reconfiguration, the processing system 110 uses extended instructions that can be configured into the Instruction Set Extension Fabric 130 to accelerate an executing application program. ISEF reconfiguration advantageously can add extension instructions or modify characteristics of existing extension instructions after fabrication of the processor. In some embodiments, there are no finite limitations on the processing system 110 instruction set, since new instruction extensions can be generated by the compiler and configured in the ISEF 130 prior to or during execution of the application. Therefore, the embodiments relating to the configuration of the ISEF 130 to execute non-resident instructions in an application can be thought of as creating a virtual instruction set of the processing system 110. The finite set of instructions can be extended to an unlimited, virtual set of instructions through reconfiguring the ISEF 130 to add new extended instructions. It should be noted that except where reconfiguration does not occur, the term configured and reconfigured are used interchangeably; and that conventionally, the ISEF 130 is initially configured then subsequently reconfigured as explained herein.

Several different modes of ISEF 130 configuration are contemplated as varying embodiments. The most basic of these embodiments is static configuration, where the instruction extension is loaded with the executable file 780, and the ISEF 130 is configured once prior to application execution. In the static configuration embodiment, the processor core 120 executes all native instructions, and the instruction extensions are directed to the preconfigured ISEF 130 by the extension adapter 140 for execution. The ISEF 130 does not reconfigure during application execution in this static configuration embodiment.

A second embodiment of ISEF 130 configuration is explicit reconfiguration. Explicit reconfiguration is a configuration or reconfiguration of the ISEF 130 in which the executing application program directly initiates the loading of the ISEF 130 configuration memory 206 with instruction extension data in the form of a system call or similar invocation. In one explicit reconfiguration embodiment, the application preferably prefetches instruction groups before they are required to optimize application execution performance. In the explicit reconfiguration embodiments, the programmer of the application explicitly adds code to the application to load instruction extension data into the ISEF 130 configuration memory 206. The added coded includes the system call or similar invocation to initiate the loading of the ISEF 130 configuration memory with the instruction extension data. Alternative embodiments featuring explicit reconfiguration permit direct memory access (DMA), allowing the prefetch to take place concurrently with the application execution. In an embodiment where multiple ISEF's 130 are used, this DMA capability enables the application to be executing from one ISEF instruction group, while the next group of instructions are being loaded into a second ISEF.

A third embodiment for configuring the ISEF 130 is that of implicit reconfiguration. Implicit reconfiguration occurs when the running application program issues an instruction, which is not part of the resident instruction set. When a nonresident instruction is issued in this embodiment, the extension adapter 140 detects this instruction fault condition and passes the instruction extension to the ISEF 130 for reconfiguration and execution. This model of reconfiguration is referred to as implicit, because the processing system 110 relies on the extension adapter 140 to detect and process the need for the ISEF 130 operation. Programmers of the applications therefore do not need to be aware of the reconfiguration of the ISEF 130 because the reconfiguration does not depend on the programmer-inserted code in the program for reconfiguration. Instead, the reconfiguration of the ISEF 130 occurs when the extension adapter 140 detects the instruction fault condition.

Figure 8A:
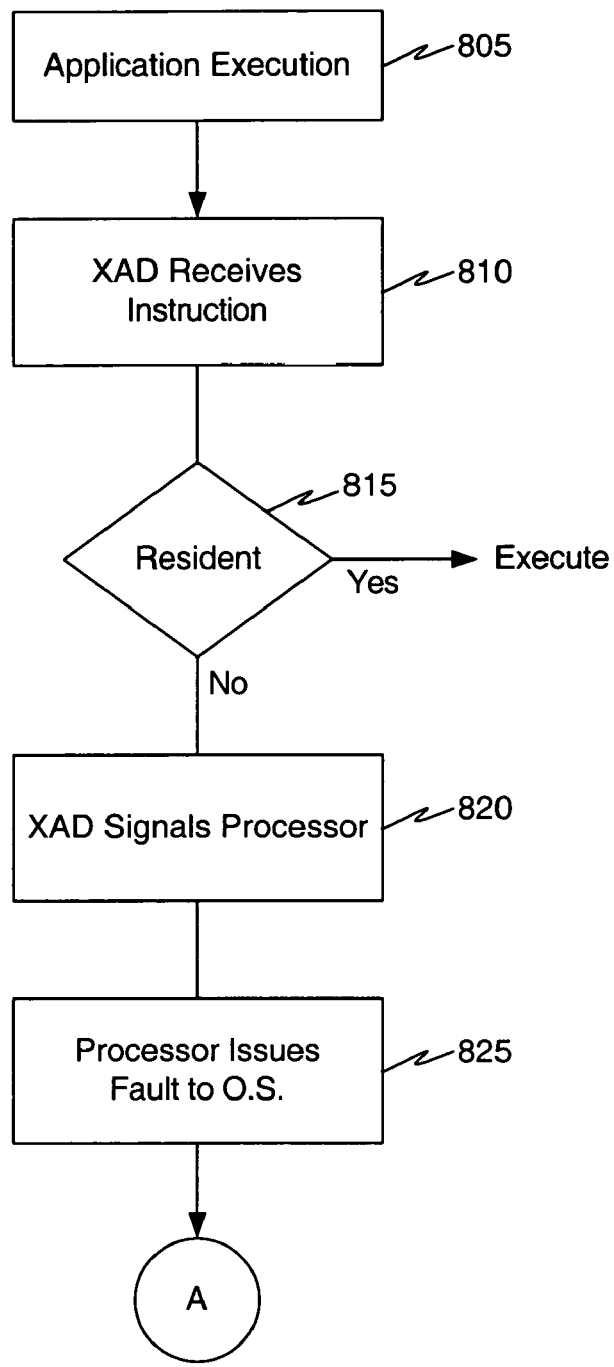
FIG. 8(a) and 8(b) illustrate a preferred process for executing an instruction extension in the implicit reconfiguration embodiment of the present invention.
Figure 8B:
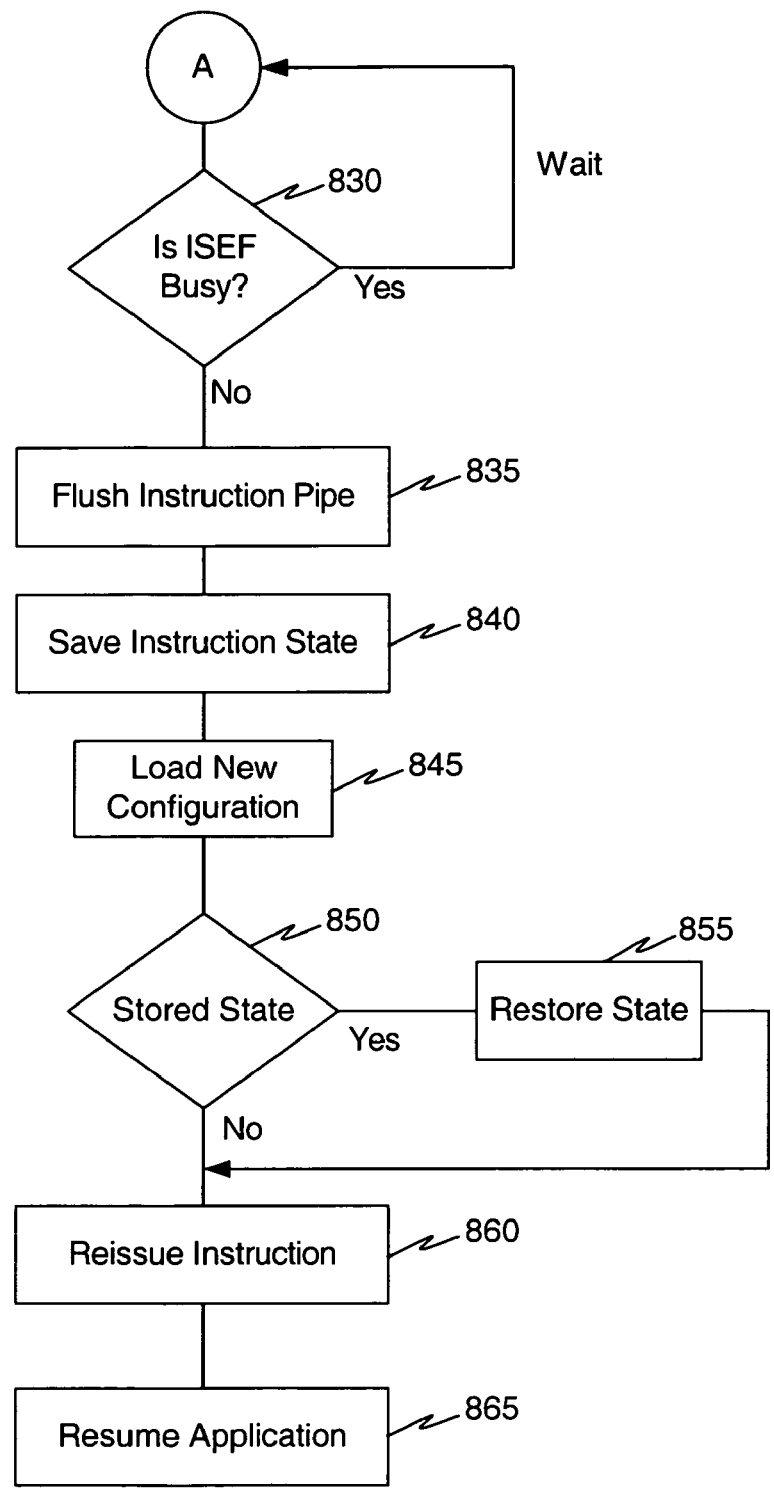

Referring now to FIGS. 8(a) and 8(b), a preferred process is described for executing an instruction extension in the implicit reconfiguration embodiment of the present invention. The process of FIGS. 8(a) and 8(b) begins in step 805 with the execution of a programmed application in the processing system 110. During processing, the extension adapter (XAD) 140 receives 810 an instruction extension, i.e. an instruction that is not native to processor core 120. In step 815, the XAD 140 checks to determine whether the received instruction extension from step 810 is in fact already resident in the ISEF 130. If the instruction extension is resident, that is currently loaded into ISEF 130, the ISEF 130 then executes the instruction extension. If the received instruction extension from step 810 is not resident, the XAD 140 signals 820 processor core 120 that the instruction extension is not resident. Upon receiving the signal in step 820 from the XAD 140, processor core 120 issues 825 an instruction fault to the processing system 110 operating system. The processing system 110 operating system then takes steps to appropriately configure the ISEF 130 to execute the received instruction extension in step 810.

Referring now to FIG. 8(b), once the operating system receives the instruction fault from processor core 120 in step 825, the XAD 140 is instructed to check 830 whether the ISEF 130 is currently busy executing an instruction. If in fact the ISEF 130 is executing another instruction, then the XAD 140 waits until the ISEF instruction is completed. After any ISEF instruction currently executing completes, then the instruction pipe is flushed 835 and the instruction state is saved in step 840 by the extension adapter XAD 140. The XAD 140 then loads 845 a new configuration into ISEF 130 and then checks 850 to determine whether a stored state exists relating to the new ISEF 130 configuration of step 845. If in fact a stored state does exist in step 850 then the XAD 140 restores 855 the state relating to the new ISEF 130 configuration. After any previously stored state is restored, then the XAD 140 reissues 860 the instruction from the application to the ISEF 130, and the instruction extension executes on the ISEF 130. Subsequently, application processing resumes in step 865.

Figure 9:
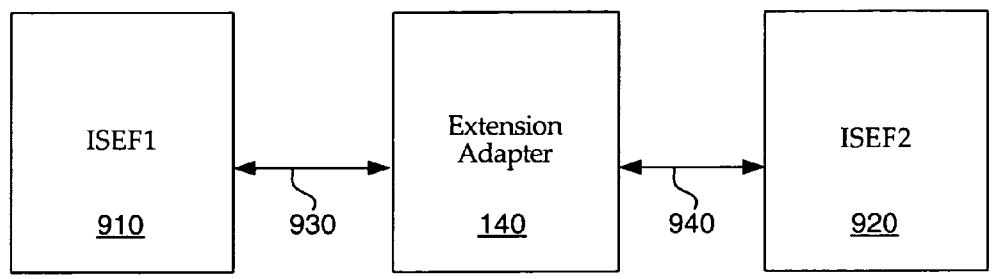
FIG. 9 is a block diagram illustrating the alternating configuration of two ISEF's in accordance with an embodiment of the present invention.

Referring now to FIG. 9, a fourth embodiment of ISEF 130 reconfiguration is shown in which two or more ISEF's are alternately configured by an extension adapter 140. Extension adapter 140 is connected to ISEF1 910 through interconnect 930. Extension adapter 140, likewise is connected to ISEF2 920 through interconnect 940. In the alternating reconfiguration model, multiple groups of instructions may be accelerated and mapped to two or more ISEF's 130: In this alternating reconfiguration mode, ISEF1 910, for example, can be executing a set of instruction extensions, while ISEF2 920 is contemporaneously loading a new reconfiguration file in preparation for a set of instruction extensions to be later executed. In this way, configuration of one ISEF 130 may overlap execution on the processor core 120, of another ISEF 130. Execution of instruction extensions may be predicted and speculatively loaded into a ISEF 130 while the application is executing on the processor core 120 or in another ISEF 130. A significant benefit of alternating reconfiguration is that the processing system 110 is able to reduce or avoid delays that might be encountered in ISEF 130 configuration by loading, for example, ISEF2 920 while the processing system 110 is using ISEF1 910 for executing an instruction extension. Once the used ISEF1 910 configuration is completed, processing may then switch to the preconfigured ISEF2 920 while the contents of ISEF1 910 are flushed and reprogrammed.

Figure 10:
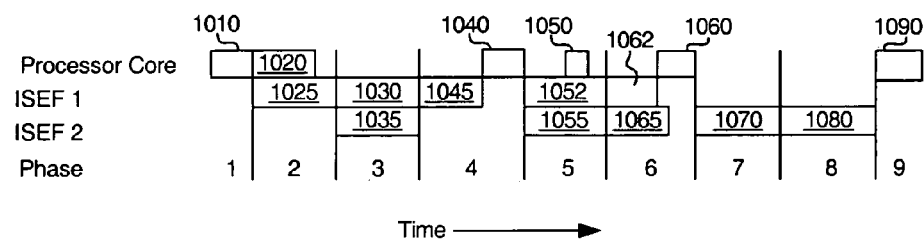
FIG. 10 is a timing diagram showing the various time phases during alternating configuration of the two ISEF's of FIG. 9.

Referring now to FIG. 10, a timing diagram is illustrated showing the various timing phases of the processor core 120 and the ISEF's 910 and 920. During phase 1, the processor core 120 is loading 1010 the application within the processing system 110. In phase 2 of FIG. 10, the application begins execution 1020 on the processor core 120 and starts loading 1025 the first instruction extension into ISEF1 910. During phase 3, the first instruction extension begins executing 1030 on ISEF1 910. The application also predicts the next instruction extension to execute, and speculatively loads 1035 the configuration ISEF2 920. The first instruction extension executing in ISEF1 910 completes 1045 execution and control returns 1040 to the processor core 120 in phase 4. In phase 5, the second instruction begins execution 1055 on ISEF2 920 while the next extension instruction is speculatively loaded 1052 into ISEF1 910. The configuration of ISEF1 910 runs longer than the execution 1055 of the second instruction extension in ISEF2 920 in the subsequent instruction extension computation on the processor core 120, so the application stalls 1060 waiting for the completion of the configuration 1060 at the end of phase 5. In phase 6, the third instruction extension begins execution 1062 on ISEF1 910 while the fourth extension instruction is predicted and loaded 1065 in ISEF2 920. At the beginning of phase 7, the previous prediction is determined 1060 to be incorrect and a new configuration is loaded 1070 into ISEF2 920. Once the correct configuration is complete the final loop is executed 1080 on ISEF2. In phase 8, the application finishes 1090 on the processor core 120 in phase 9.

Figure 11:
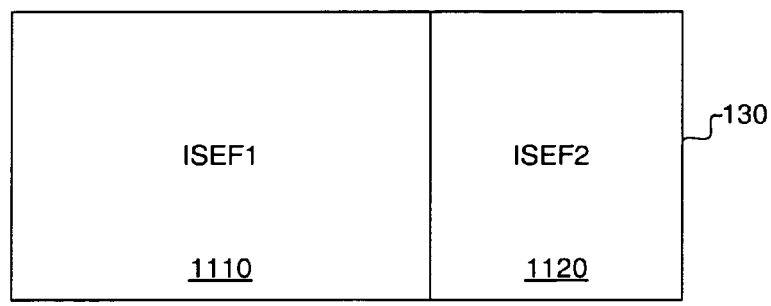
FIG. 11 is a block diagram illustrating partial Instruction Set Extension Fabric reconfiguration in accordance with the present invention.

Referring now to FIG. 11, a graphic is shown of ISEF 130 containing two Instruction Set Extension Fabrics ISEF1 110 and ISEF2 1120. A fifth embodiment of ISEF1 130 reconfiguration is a mode in which ISEF 130 is partially configured into two or more Instruction Set Extension Fabrics of equal or differing sizes. In this reconfiguration embodiment, ISEF1 1110 may be sized appropriately as needed by a specific instruction extension, and the remainder of ISEF 130 is available for use in the creation and configuration of additional partial ISEF's. These partial ISEF's are preferably available for use in the alternating reconfiguration model explained with reference to FIGS. 9 and 10. Although FIG. 11 shows ISEF 130 divided into two partial ISEF's of equal size, ISEF 130 shown in FIG. 11 could readily be subdivided into any number of sizes and partitions for use in operating with one or more processor cores 120.

It will be obvious to those skilled in this art that the operation of the XAD 140 and the ISEF 130 is similar with respect to instructions as the handling of data in virtual memory.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. Accordingly, the specification and drawings are to be regarded as illustrative rather than restrictive.

The invention claimed is:

1. A processing system with reconfigurable instruction extensions, the system comprising: a processor operable to execute a computer program comprising a set of computational instructions and at least one instruction extension; programmable logic operable to receive configuration information to configure the programmable logic for the instruction extension and operable to execute the instruction extension; an extension adapter coupled to the processor, the extension adapter operable to: detect an instruction extension issued by the processor, detect a residency of the issued instruction extension in the programmable logic, and communicate an exception to the processor based on residency of the issued instruction extension in the programmable logic; the processor operable to issue a fault to the operating system in response to the exception; a register file coupled to the programmable logic and operable to store data; and a load/store module operable to transfer the data directly between the register file and a system memory.

2. The processing system of claim 1 wherein the extension adapter is operable to detect residency of the instruction extension in the programmable logic based on contents of a resident instruction table in the extension adapter.

3. The processing system of claim 1 wherein the processor is operable to execute a computer program comprising a set of computational information to load the configuration information into the extension adapter.

4. The processing system of claim 2 wherein the extension adapter is operable to load the configuration information into the programmable logic.

5. The processing system of claim 4 wherein the processor is operable to initiate loading of configuration information into the extension adapter concurrently with the execution of a computer program using direct memory access.

6. The processing system of claim 1 wherein the extension adapter is operable to detect whether the programmable logic is busy executing another instruction extension and wait until the programmable logic is finished executing the another instruction extension.

7. The processing system of claim 1 wherein the extension adapter is operable to determine whether a stored state exists for the instruction extension and restore the stored state in the programmable logic for the instruction extension.

8. The processing system of claim 7 wherein the extension adapter is operable to store the stored state for the instruction extension.

9. The processing system of claim 1 further comprising configuration memory operable to store configuration information for the programmable logic.

10. The processing system of claim 4 wherein the processor is operable to load configuration information into the extension adapter.

11. The processing system of claim 1 wherein a computer program initiates a load of configuration information into the programmable logic.

12. The processing system of claim 1 wherein a computer program initiates a load of configuration information into the programmable logic using a system call.

* * * * *

UNITED STATES PATENT AND TRADEMARK OFFICE
CERTIFICATE OF CORRECTION

PATENT NO. : 7,610,475 B2  Page 1 of 1
APPLICATION NO. : 11/204555
DATED : October 27, 2009
INVENTOR(S) : Arnold et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1108 days.

Signed and Sealed this

Twelfth Day of October, 2010

David J. Kappos
*Director of the United States Patent and Trademark Office*